United States Patent [19]

Batchko

[11] Patent Number: 5,148,310
[45] Date of Patent: Sep. 15, 1992

[54] ROTATING FLAT SCREEN FULLY ADDRESSABLE VOLUME DISPLAY SYSTEM

[76] Inventor: Robert G. Batchko, 1850 Midland, Highland Park, Ill. 60035

[21] Appl. No.: 575,071

[22] Filed: Aug. 30, 1990

[51] Int. Cl.$^5$ ............................................. G02B 27/22
[52] U.S. Cl. .................................... 359/479; 359/462
[58] Field of Search .................... 359/462, 479, 478

[56] References Cited

U.S. PATENT DOCUMENTS

| | | | |
|---|---|---|---|
| 3,140,415 | 7/1964 | Ketchpel | 313/146 |
| 3,541,238 | 11/1970 | Enloe et al. | 358/88 |
| 3,682,553 | 8/1972 | Kapany | 352/86 |
| 3,761,154 | 9/1973 | Shupe et al. | 350/3.5 |
| 3,818,129 | 6/1974 | Yamamoto | 250/199 |
| 3,970,361 | 7/1976 | Di Matteo et al. | 350/144 |
| 4,023,158 | 5/1977 | Corcoran | 340/324 R |
| 4,130,832 | 12/1978 | Sher | 358/89 |
| 4,290,083 | 9/1981 | Collender | 358/88 |
| 4,339,168 | 7/1982 | Haines | 350/3.69 |
| 4,799,103 | 1/1989 | Muckerheide | 358/88 |
| 4,834,473 | 5/1989 | Keyes, IV et al. | 350/144 |
| 4,843,851 | 7/1990 | Lang et al. | 358/87 |
| 4,870,485 | 9/1989 | Downing et al. | 358/90 |
| 4,871,231 | 10/1989 | Garcia, Jr. | 350/144 |
| 4,896,150 | 1/1990 | Brotz | 358/88 |

OTHER PUBLICATIONS

Cooper and Shepard, "Turning Something Over in the Mind", *Scientific American*, vol. 251/#6, Dec. 1984, pp. 106-114.
Nielson, "Beyond the Mouse", *Macworld*, vol. 5, Jan. 1988, p. 89 (2).
Williams et al., "Volume visualization displays", *Information Display*, vol. 5, No. 4, Apr. 1989, pp. 8-10.
Hawkins, "3-D Display", *Popular Science*, vol. 234, May 1989, p. 28 (1).
Helliwell, "Fish-Tank Display Creates True 3-D Images", *PC Week*, vol. 6, Sep. 25, 1989, p. 19 (1).
Miller, "What Biofeedback Does (and Doesn't) Do", *Psychology Today*, vol. 23, Nov. 1989, p. 22 (3).
"'Revolutionary' System Creates 3-D Images in Minutes", *Design News*, vol. 46, Apr. 23, 1990, pp. 46-47.
Levy, "Brave New World", *Rolling Stones*, issue #580, Jun. 14, 1990, pp. 92-100.

*Primary Examiner*—Scott J. Sugarman
*Attorney, Agent, or Firm*—Welsh & Katz, Ltd.

[57] ABSTRACT

A rotating flat screen fully addressable volume display system incorporates a rotating flat screen upon which is projected a two-dimensional scanned image. The rotating screen serves to decode the image, creating a three-dimensional display of that image in a full cylindrical volume of space. A system of reflectors, rotating in unison with the screen, is positioned between the screen and the two-dimensional image generator to allow the two-dimensional image to strike the surface of the rotating screen at a constant angle throughout rotation. The display is capable of being presented in color and updatable in real time.

48 Claims, 3 Drawing Sheets

ROTATING FLAT SCREEN FULLY ADDRESSABLE VOLUME DISPLAY SYSTEM

BACKGROUND OF THE INVENTION

It has long been known in the art that an autostereoscopic, three-dimensional, volume display can be created by imposing a two-dimensional image on an imaging surface, or display screen, and then rapidly moving the imaging surface along a third axis.

In the method of imaging known as angular multiplaning, the display screen is rotated about an axis so oriented as to cause the image on the screen to sweep through the desired volume of space. One such system is found in Ketchpel, U.S. Pat. No. 3,140,415 which utilizes a phosphorescent rotating screen being illuminated by fixed electron gun means. Serious drawbacks to such a system, related to the lag time of the phosphors, have been discussed in detail in Muckerheide, U.S. Pat. No. 4,799,103. Additional drawbacks to such a system arise from the requirement of enclosing the screen and electron gun means in a vacuum. Muckerheide also discusses the evolution of the art towards incorporating lasers as image generation sources. Currently, such use of lasers is widely practiced.

A three-dimensional, volume image created by a rotating display screen system is limited to only occupying the volume of space which is swept by the rotating screen. If, for a flat display screen, the axis of rotation does not lie in the plane of the screen, but rather passes obliquely through it, then blank, non-addressable conic spaces, determined by the angle of the display screen relative to the axis of rotation, will appear, thus reducing the overall volume of space in which the image may be generated. Such a system is disclosed by F. Garcia, Jr. in U.S. Pat. No. 4,871,231. Unfortunately, the display created by this system is limited to an addressably incomplete spatial or cylindrical volume due to the restriction that the axis of rotation must pass obliquely through the plane of the screen.

Helliwell, "'Fish Tank' Display Creates True 3-D Images," *PC Week*, V. 6, Sep. 25, 1989, p. 19 (1), describes a similar system designed by F. Garcia, Jr. and D. Williams of Texas Instruments in Dallas, which attempts to solve the above-identified problem by incorporating a double helix shaped rotating screen. Although the screen in this system sweeps a complete cylindrical volume, a blank cylindrical space, inaddressable by the image light, still exists along the axis of rotation, thus once again limiting the display space to an incomplete cylindrical volume. Also, due to the irregular surface of the double helix screen, the system requires complicated and costly scanning techniques and computing sofware which lengthens the time between data acquisition and display. While helically-shaped screen displays are theoretically potentially fully addressable, they will require a plurality of scanners to achieve such full addressability. This requirement will further increase the overall size and expense of the system.

Another inherent problem with rotating screen displays is the inconsistency of image brightness at various viewpoints relative to the position and shape of the screen. This phenomenon is due to the minimal amount of light which is scattered off of the screen at angles to the plane of the screen which approach zero degrees. Whenever an eye of the observer falls in the plane of space defined by the rotating screen, virtually no image light reaches that eye, thus creating a blank area. Some amount of natural compensation for this problem occurs due to the horizontal parallax between the eyes of the viewer; however, this partial solution is dependent upon the binocular vision of the viewer, the nature of the screen, and the viewer's distance from the display.

Another problem with three-dimensional volume displays is the inability of images in the display to exhibit optical traits known to physical objects. Such traits include, but are not limited to, the reflection of light off of surfaces of objects, the refraction of light through lenses, and the inability to see the rear surface of an opaque solid object. It is well known in the art that volume display images possess a "ghost-like" transparent quality.

Accordingly, it is an object of the invention to minimize the above problems by providing a rotating flat screen fully addressable volume display and system utilizing a rotating flat screen in which the axis of rotation lies in the plane defined by the screen, and where the image light may be addressed onto all points of the screen at all angular positions.

It is an additional object of the present invention to provide a display screen which evenly distributes the intensity of image light reflected off of and transmitted through the screen at all angles to the optical axis of the projected image.

It is a further object of the present invention to provide a means for simulating in three-dimensional images the same optical qualities existing in physical objects, such qualities corresponding to the specific viewpoint of the observer relative to the position of the display.

It is a still further object of the present invention to provide a display screen which minimizes drag due to wind resistance, thereby allowing for larger three-dimensional displays and faster display screen rotation.

It is further object of the present invention to provide provide laser beams of different colors, where various colored laser beams may be combined with one another to generate blanking techniques which can eliminate or alternatively enhance specific characteristics of the three-dimensional presentation.

It is another object of the present invention to provide a three-dimensional system which can store preselected images and rapidly access and display, modify, and/or enhance such images in accordance with variations in the data input signal. The persistence of vision of the human observer thereby will cause the discrete three-dimensional images to fuse together, thus forming a three-dimensional "movie" in real time.

It is yet another object of the present invention to provide a three-dimensional biofeedback display system in which the data input signal is a function of the three-dimensional display image. This implementation of imagined spatial operations, or "spatial thinking," towards the acute self-control of specific physiological processes would be extremely valuable in biofeedback training. In one application, a biofeedback subject who has gained sufficient skills through practice with such a three-dimensional biofeedback display system might be able to control a cursor in the three-dimensional display or pull up specific stored images for display. Such skills would be of immeasurable benefit to victims of paralysis.

It is yet another object of the present invention to provide an inexpensive and easily operable three-dimensional system capable of functioning without the aid of a computer, whereby the image control signals are themselves a function of the image to be ultimately displayed.

It is yet a further object of the present invention to provide specific mathematical functions to be applied to the image signals towards the correction of unwanted distortion or skewing in the final three-dimensional display.

It is yet another object of the present invention to provide a three-dimensional display system, or "theater," for the objective viewing of, and interaction with, Virtual Reality.

It is yet another object of the present invention to provide a fully addressable three-dimensional display system including a rotating flat screen wherein a single scanner is used to address all points in the image volume.

SUMMARY OF THE INVENTION

In accordance with the present invention, the aforementioned problems associated with the prior art as well as other problems are overcome, and there is provided a three-dimensional, fully addressable or fully cylindrical volume display system which is readily updatable in real time.

The present system includes a flat display screen which rotates about an axis coincidental to the plane of the screen. As is well known in the art, the display screen can be translucent so that it may be illuminated from the front and/or rear. A two-dimensional scanner unit, such as a (Z-R) scanner unit, provides a color, laser-generated raster scan pattern ((Z-R) scanned image) to be projected towards the screen along an optical axis of rotation of same screen.

A system of rotating reflectors, rotating in unison with the screen, is positioned on and about an axis of rotation coincidental with the axis of rotation of the screen and optical axis of the (Z-R) scanned image between the screen and the (Z-R) scanner unit. The rotating reflector system serves to intercept the (Z-R) scanned image before reaching the screen and redirects the image such that the plane of the image strikes the surface of the screen at a constant angle throughout the rotation.

In the preferred embodiment of the invention, the (Z-R) scanner unit is controlled by a computer. In order for the system to accurately display a desired three-dimensional image, the computer provides signals corresponding to angularly rotated cross-sections of the same image. Each individual cross-section, or slice, is presented as an individual raster frame by the (Z-R) scanner unit. The rotating reflector system and rotating screen then serve to spatially reconstruct the desired three-dimensional image by fusing together the individual image slices. As a result of the viewer's persistence of vision, a three-dimensional volumetric image is observed.

In a preferred embodiment of the present invention an attenuation processor may be utilized to modify the computer's image control signals towards correcting any distortion in the final three-dimensional image which is caused by the rotating reflector system's redirecting of the path of the (Z-R) scanned image towards the screen.

In the preferred embodiment of the present invention, data acquisition devices may be operably connected to the computer. The data acquisition device serves to transmit to the computer image data corresponding to the desired image sought to be displayed so that the image may be displayed in a three-dimensional volumetric manner.

In an additional embodiment of the present invention, the display screen's surface may be accordingly etched, or formed, to comprise a plurality of minute forms consisting of, but not limited to, spheres or cylinders of diameters generally equal to or slightly smaller than the diameters of the light beams comprising the (Z-R) scanned image. These forms would serve as general point sources of the image light, where destructive interference fringes of the diffraction patterns behind the forms would be compensated for by the overlapping of neighboring diffraction patterns, as well as by the parallax of vision on the part of the viewer.

DETAILED DESCRIPTION OF THE DRAWINGS

Figure 1:
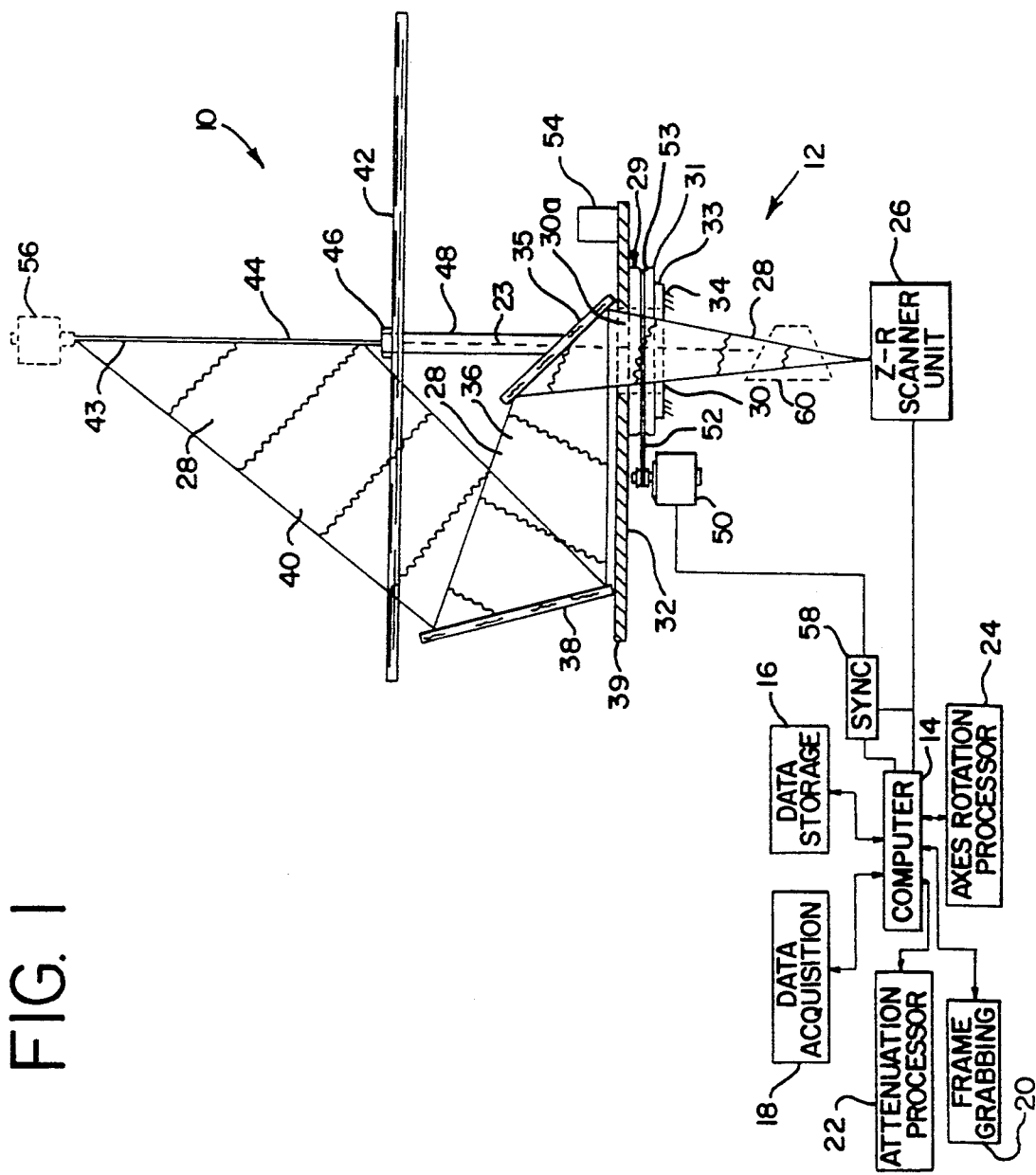
FIG. 1 is a diagrammatic representation of the present rotating flat screen fully addressable volume display system specifically illustrating the rotating reflector system and rotating screen.

Referring now to FIG. 1, the preferred embodiment of the rotating flat screen fully addressable volume display system is generally indicated at 10 and includes a rotating reflector system 12.

A computer 14 is utilized to receive signals from a plurality of input devices and to subsequently generate graphics signals. The input devices to the computer 14 include, but are not limited to, a data storage module 16 and a data acquisition module 18. The data storage module 16 may include optical and/or magnetic disk storage systems; however, any other state-of-the-art data storage systems may be employed as alternatives. The data acquisition module 18 may include cameras, fiber optics, or any other state-of-the-art method of image data acquisition. It is further contemplated that the data acquisition module 18 may additionally include a light pen, keyboard, DATAGLOVE manual input device, or any other state-of-the-art data acquisition system in which an operator may interact with the three-dimensional display.

It is yet additionally contemplated that the data acquisition module 18 may also include process control systems whereby process variable information may be monitored and controlled as a function of the three-dimensional display. It is contemplated and fully within the scope of the present invention that the data acquisition module 18 may include any state-of-the-art method or instrument for acquiring three-dimensional data as understood by those skilled in the art. It is contemplated that the data acquisition may be accomplished by a light pen and three-dimensional viewing system thereof, or other state-of-the-art three-dimensional coordinate acquisition instrument. Also contemplated are devices for allowing an operator to locate specific points on the three-dimensional display and interact with and update the display in real time, as understood by those skilled in the art.

It is also contemplated and fully within the scope of the present invention that such a data acquisition module 18 may utilize a head tracking system, as understood by those skilled in the art, to digitally locate the position of the operator, relative to the display, so that the computer 14 may enhance or modify the three-dimensional volume image in accordance to the viewing perspective of the operator. Such applications may include, but are not limited to, the simulation of the reflection of light sources off the surfaces of images in the display, whereby the intensity and color of different portions of the images change in accordance to changes of the viewpoint of the operator, thus creating the effect of light reflecting off of the displayed image into the eyes of the operator.

It is additionally within the scope and contemplation of this invention that the data acquisition module 18 includes, but is not limited to, an audio amplifier, photocells, a smoke detector, or a biofeedback device whereby the sophisticated and costly computer-aided processing of corresponding real time data would not be necessary for providing three-dimensional display images. The ability of such a system to inexpensively provide real time updated, three-dimensional, volumetric images, without the aid of a computer, has vast applications in areas such as entertainment and advertising.

A frame grabbing module 20 is shown connected to the computer 14. The frame grabbing module 20 may be employed to "grab" a single image from the successively generated images produced by the computer 14 for further processing and viewing.

A data attenuation processor 22 is shown connected to the computer 14. The attenuation processor 22 serves to perform specific attenuation functions on the graphics signals produced by the computer 14. Although described in greater detail below, the attenuation processor 22 ensures that the image produced by the system 12 will be a full volume or fully addressable image free of unwanted distortion or skewing.

A second modification of the image signal is also required to correct a continuous rotation of axes of the image in the plane of the screen. To achieve this correction, an axes rotation processor 24 is utilized and is connected to the computer 14. As the display screen 44 (described below) rotates about a vertical axis 23, an image on the screen is subjected to a continuous rotation of axes at a speed equal to the speed of display screen rotation. Therefore, it is necessary that the image plane 66 (described below) of the (Z-R) scanned image 28 (described below) must undergo a continuous rotation of axes in unison with the rotation of the rotating reflector system 12 and the rotating screen. The axes rotation processor 24 is connected to the computer 14 so as to modify the image control signals such that this continuous rotation of axes is included in the (Z-R) scanned image.

It should be noted that although the data storage module 16 and the data acquisition module 18 have been discussed as input devices to the computer 14, each of these systems may also be controlled by the computer 14. For example, image control data, after modification by the computer 14, the attenuation processor 22, and the axes rotation processor 24 can be transmitted to the data storage module 16 for storage, whereby "playback" of such modified image control data would negate the need of the attenuation processor 22 and/or the axes rotation processor 24 for image correction purposes, and the data acquisition module 18 may be controlled by the computer 14.

A (Z-R) scanner unit 26 is shown connected to the computer 14. The scanner 26 is preferably a color laser scanner of the type well known in the art, and it is fully contemplated and within the scope of this invention that any state-of-the-art scanners as understood by those skilled in the art could be employed in the present system 10. The (Z-R) scanner unit 26 is driven by the graphics signals of the computer 14 and serves to produce a two-dimensional, (Z-R) scanned image 28. In the preferred embodiment, the image 28 is generated by lasers contained in the scanner 26; however, a projection television or any other state-of-the-art light source system as understood by those skilled in the art may be employed.

As is well known in the art, the (Z-R) scanned image 28 may consist of color or monochromatic light. The (Z-R) scanner unit 26 may include acoustic-optical, electro-optical, mechanically moved mirrors, LCD shutters, or any other state-of-the-art scanning system as understood by those skilled in the art. It is additionally contemplated that images 28 from a plurality of (Z-R) scanner units 26 may be combined or interlaced along a single optical axis towards enhancing the final three-dimensional display. It is also contemplated, and well known in the art, that additional scanners 26 may be used to independently address specific subspaces of the overall display volume, and such scanners may be interlaced to provide higher resolution.

The rotating reflector system 12 serves to redirect the path of the (Z-R) scanned image 28 towards the creation of the final three-dimensional display. The rotating reflector system 12 includes a first bearing assembly 29 having an axial throughbore 30. The throughbore 30 of the first bearing assembly 29 is of large enough diameter for the (Z-R) scanned image 28 to pass through unimpeded. The first bearing assembly 29 includes a freely rotating portion 31 which is coupled to a rotating support arm 32. A fixed portion 33 of the bearing 29 is secured to a frame or substrate indicated at 34. The rotating support arm 32 also has an opening 30a which is coaxial with the opening 30 and is of appropriate size for the unimpeded clearance of the (Z-R) scanned image 28 which passes therethrough.

The first bearing assembly 29 and the rotating support arm 32 are positioned to rotate about the vertical axis 23, which is coaxial with the optical axis of the (Z-R) scanned image 28. After passing through first bearing assembly 29 and rotating support arm 32, the (Z-R) scanned image 28 strikes a first reflector 35. It is contemplated and fully within the scope of this invention that the first reflector 35, as well as the rotating reflector system 12, may include mirrors, lenses, prisms, fiber optics, or any and all other optical means of modifying or enhancing a final three-dimensional display as understood by those skilled in the art.

The first reflector 35 is coupled to the rotating support arm 32, and reflects the (Z-R) scanned image 28 in an image path 36 upon a second reflector 38, which is coupled to a first end 39 of the rotating support arm 32. It should be noted that the second reflector 38 may consist of a fixed, internally reflective frusto conical reflector, or a fixed, multifaceted, internally reflective frusto conical reflector. Such a reflector 38 covers the entire image path 36 swept by the first reflector 35. If desired, the reflector 38 need not be coupled to the rotating support arm 32, but instead, may be provided as a reflective ring which engages the image path 36 throughout the rotation of the arm 32.

The second reflector 38 reflects the (Z-R) scanned image 28 in a path 40 which, if desired, may be transmitted through a preferably fixed transparent plate 42. After passing through the plate 42, the (Z-R) scanned image 28 strikes a front surface 43 of the display screen 44, which is coupled to the rotating reflector system 12 so that the screen 44 rotates with the first and second reflectors 35 and 38, respectively. If desired, an optional second bearing assembly 46 and a coupling assembly 48 may be used to assist in rotating the screen 44.

The surface 43 of the display screen 44 may include phosphor material affixed thereto to permit the manipulation and observation of the scanned image 28. It is contemplated that the phosphor material may be of the type which is sensitive to nonvisible radiation such as x-ray or ultraviolet light emissions generated by the (Z-R) scanner unit 26. Accordingly, a (Z-R) scanner unit emitting light in the x-ray or ultra violet spectrum may be utilized as the phosphor coated screen surface 43 and will cause the non-visible (Z-R) scanned image 28 to be observable by the human eye.

The rotating reflector system 12 and coupled screen 44 are preferably driven by a first motor 50 and belt 52 which engages a groove 53 in the rotating portion 31 of the bearing 29, although the use of any other state-of-the-art forms of drive mechanisms are contemplated. A counterbalance 54 is shown coupled to the rotating support arm 32 at an opposite end to the second reflector 38. The counterbalance 54 serves to provide a state of static and dynamic equilibrium to the rotating reflector system 12.

If desired, the present system 10 may alternatively incorporate a second motor 56 for directly driving the rotation of the screen 44. By incorporating this second motor 56, the coupling assembly 48 is no longer necessary, and the screen 44 may be spaced farther apart from the fixed transparent plate 42. A synchronization module 58 is shown connected to the computer 14, the motor 50, and the (Z-R) scanner unit 26. The synchronization module 58 preserves the proper phase relationship between the rotating screen 44 and the (Z-R) scanned image 28. Thus, the synchronization module 58 is operably and electrically connected to the (Z-R) scanner unit 26 for synchronizing the frame rate of the scanned image 28 with the motion of the display screen.

If desired, the present system 10 may employ an image rotator prism 60. As the axes rotation processor 24 performs an electronic continuous rotation of axes on the (Z-R) scanned image 28, the image rotator prism 60 performs the same function by a mechanical-optical process. This mechanical-optical rotation provided by the prism 60 additionally serves to eliminate rotation of axes in the pixel arrangement of the (Z-R) scanned image 28 in the plane of the screen 44. Such an effect is desirable and useful in many applications. The image rotator prism 60 may be driven in conventional fashion by motors 50, 56, or by a third motor (not shown). It should be noted that although a preferred embodiment utilizes an image rotator prism 60, any and all state-of-the-art optical image rotation systems as understood by those skilled in the art may be employed.

Although the preferred embodiment uses a rotating reflector system 12 and the (Z-R) scanner unit 26 to address the screen 44 from below, it is contemplated and fully within the scope of the present invention that a similar rotating reflector system 12 and a (Z-R) scanner unit 26 may be alternately used to address the screen 44 from above. Also, a pair of such systems 12 may be provided to simultaneously address the screen 44 from above and below.

Figure 2:
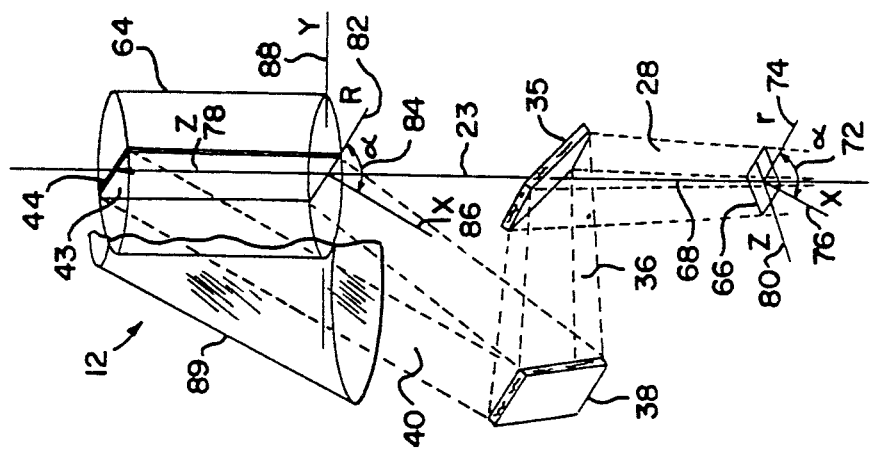
FIG. 2 is a diagrammatic representation of the present system's use of both rotating reflectors and a rotating screen to transform a two-dimensional coordinate system undergoing continuous rotation of axes to a three-dimensional cylindrical or Cartesian coordinate system.

Referring now to FIG. 2, the rotating reflector/rotating screen system 12 transforms the continuously rotated Cartesian (Z-R) coordinate axes from the two-dimensional (Z-R) scanned image 28 to a cylindrical coordinate system in a final three-dimensional display 64 created by the rotation of the screen 44. The image plane 66 of the (Z-R) scanned image 28 is projected along an optical axis 68 which is coextensive with the vertical axis 23.

As was the case in FIG. 1, the (Z-R) scanned image 28 strikes the first reflector 35, which is located on the optical axis 68. The (Z-R) scanned image 28 reflects off of the first reflector 35 and forms an image path 36 which strikes the second reflector 38. The (Z-R) scanned image 28 in the form of the image path 40 then reflects off of the second reflector 38 and strikes the surface 43 of the screen 44.

The reflectors 35 and 38 rotate in unison about the vertical axis of rotation 23, which is coaxial to the optical axis 68. The screen 44 is positioned coincidental to the axis of rotation 23. The image plane 66 undergoes continuous rotation of axes in unison with the rotation of the reflectors 35 and 38 and the display screen 44. An angle of rotation ($\alpha$) 72 is the degree of axial rotation in image plane 66 between a radial (r) axis 74 and a fixed reference (x) axis 76. In the three-dimensional display 64, an axis (Z) 78 is coaxial to the axis of rotation 23. The coordinates (z) 80, (r) 74, and ($\alpha$) 72 in the image plane 66, correspond respectively to cylindrical coordinates (Z) 78, (R) 82, and ($\alpha'$) 84 in the three-dimensional display 64 and may be easily converted to Cartesian coordinates (X) 86, (Y) 88, and (Z) 78.

In the preferred embodiment, the present system 10 includes the data storage module 16 (best seen in FIG. 1) for providing image control data to the computer 14, as well as for storing such data directly from the data acquisition module 18, or for storing such data, or modified data, from the computer for later display of the three-dimensional image 64. It is contemplated and fully within the scope of the present invention that a vast plurality of such three-dimensional images 64 may be stored, rapidly accessed, modified and/or enhanced, and displayed. Due to the persistence of vision of the human observer, a real time three-dimensional "movie" can thus be produced.

In the following description of the function of the attenuation processor 22, we will, for better clarity of understanding, assume that the axis of rotation 23 of the system 12 is coincidental to a hypothetical vertical axis of both Cartesian and cylindrical coordinate systems. It is, however, contemplated, and within the scope of the present invention, that the axis of rotation 23 may occupy any orientation in space.

Specifically, the appearance of distortion, or skewing, along the Z (vertical) axis 78 and about the R (radial cylindrical) axis 82 of the final three-dimensional image 64 is the result of the image plane 66 striking the plane belonging to the surface 43 of the screen 44 at an acute, non-zero angle. This distortion can be corrected electronically by properly attenuating the image signal for each individual point on the image. Two functions are used; one is applied to the z-axis 80 coordinates of the two-dimensional projected image 28 and corresponds to the attenuation of vertical, or Z-axis 78 coordinates of the final three-dimensional image 64; the other is applied to the r-axis 74 coordinates of the two-dimensional projected image 28 and corresponds to the attenuation of radial or R-axis 82 coordinates of points on the final three-dimensional image 64.

In these functions, L and Q are constants corresponding to the physical arrangement of the rotating reflectors 35,38, the (Z-R) scanner unit 26, and the rotating screen 44 relative to each other.

The functions are:

$$Z_c = \frac{LZ_d \cos(Q)}{Z_d \sin(Q) + L}$$

and $$R_c = \frac{R_d L}{Z_d \sin(Q) + L}$$

where

L = the total path length of the optical axis belonging to the (Z-R) scanned image 28 between its origin at the (Z-R) scanner unit 26 and it endpoint at the screen 44;

Q = the angle between the optical axis 68 of the (Z-R) scanned image 28 and an axis normal to the surface 43 of the screen 44;

$Z_d$ = the desired Z-axis 78 coordinate of each point on the final three-dimensional image 64;

$Z_c$ = the corrected Z-axis 78 coordinate of each point on the final three-dimensional image 64;

$R_d$ = the desired R-axis 82 coordinate of each point on the final three-dimensional image 64; and $R_c$ = the corrected R-axis 82 coordinate of each point on the final three-dimensional image 64.

Figure 3:
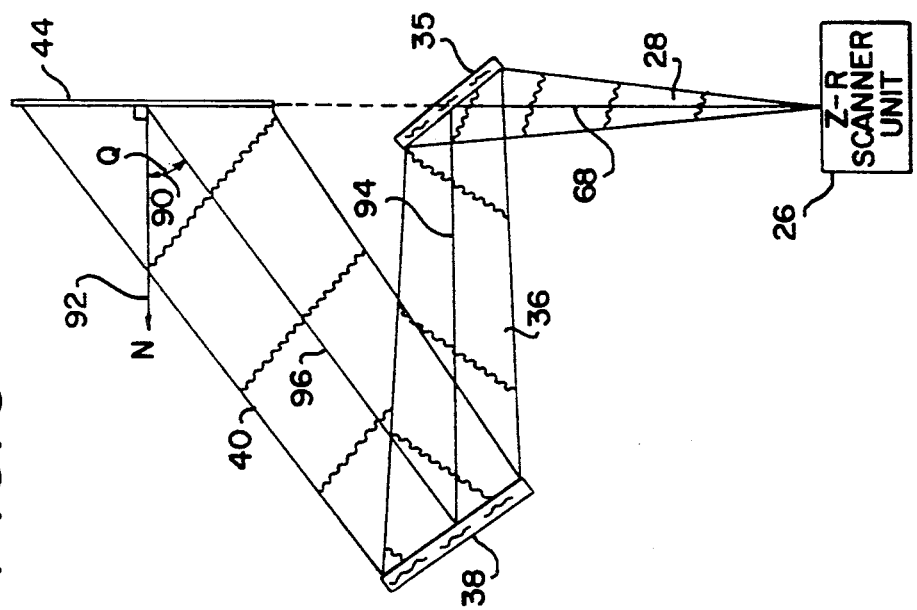
FIG. 3 is a geometric representation of the path of the optical axis of the scanned image.

All Z 78 and R 82 coordinates should be considered relative to an origin at the point where the optical axis 68 of the (Z-R) scanned image 28 strikes the surface 43 of the display screen 44 (best seen in FIG. 3). When these two functions are applied to the electronic signals designating the coordinates of each point on the three-dimensional image 64, the final three-dimensional image will appear unskewed.

If desired, the rotating screen 44 may be enclosed by a protective shell shown fragmented at 89, the shell being transparent to the frequencies of light reflected off of the screen. As shown, the shell 89 is frusto-conically shaped and encircles both the rotational path of the screen 44 and the rotational image path 40. It is contemplated that this protective shell 89 may take the form of other shapes including, but not limited to domes or cylinders.

Referring now to FIG. 3, the path of the optical axis 68 of the (Z-R) scanned image 28 is depicted, specifically illustrating constants L and Q 90 of the attenuation functions. The screen 44 is positioned apart from first reflector 35 and is also oriented about the optical axis 68 such that an N-axis 92, normal to the surface 43 of the screen 44, is coincidental to the plane containing the optical axis "legs" 94 and 96. Regarding the constants to the attenuation functions identified above, L is the total combined path length of the optical axis 68,94, and 96 between the (Z-R) scanner unit 26 and the screen 44, and Q 90 is the angle between the optical axis 96 of the (Z-R) scanned image 40 and the screen-normal N-axis 92.

Figure 4:
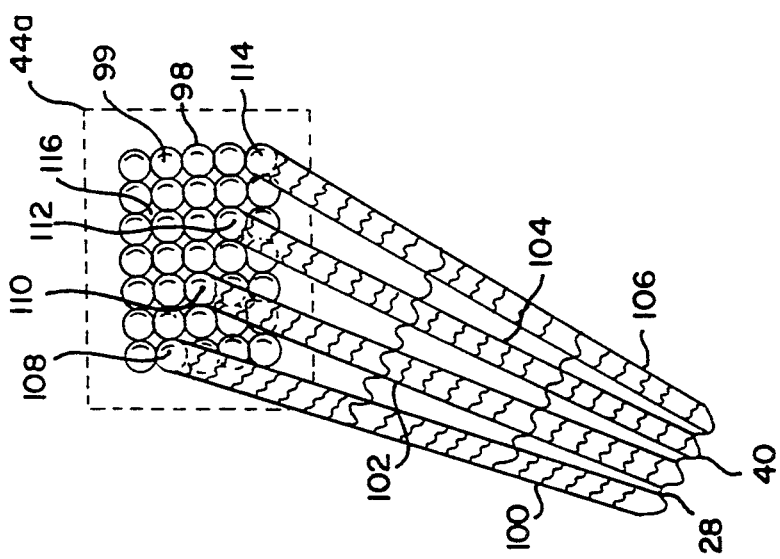
FIG. 4 is a diagrammatic representation of an alternate embodiment of the display screen in which the screen is segmented into a plurality of spheres.

Referring now to FIG. 4, a screen 44a, an alternate embodiment of the screen 44, is shown segmented into a plurality of curved shapes such as, but not limited to opaque or translucent spheres 98 which are joined to each other to form the substantially planar screen 44a. It is contemplated that the screen 44a may have a thickness which corresponds to the diameter of a single sphere 98.

In this embodiment, each and every pixel location in the (Z-R) scanned image 28 will align with a unique corresponding sphere 98. If desired, each sphere 98 may be provided with a reflective outer surface 99. The light path 40 defining the (Z-R) scanned image 28 is shown at various positions 100, 102, 104, and 106 and strikes the respective spheres 98 identified at 108, 110, 112, and 114 at the corresponding pixel locations.

It is preferred that diameters of the spheres 98 are approximately sized relative to the diameters of light beams 100, 102, 104 and 106 comprising the scanned image 28, so that upon being struck by the light beams, the spheres 98 serve as general point sources of light thereof. However, the spheres 98 may be uniformly or irregularly shaped. In this fashion, each sphere 98 serves as a general point source of image light, emitting such light generally evenly in all directions, thus enhancing the three-dimensional display 64.

Further, any screen material 116 disposed between adjacent spheres 98 can be removed. This perforation of the screen 44a will allow air to pass freely through the screen 44a throughout rotation to reduce drag on the screen. It is also contemplated that such spherical convex reflectors may be composed of minute reflective particles suspended in holographic film.

Figure 5:
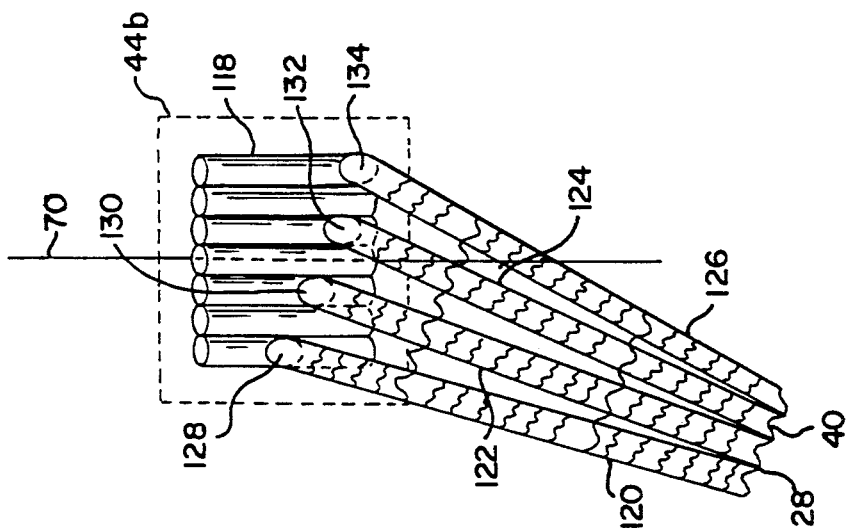
FIG. 5 is a diagrammatic representation of an alternate embodiment of the display screen in which the screen is segmented into a plurality of cylinders.

Referring now to FIG. 5, a screen 44b is shown segmented into a plurality of cylinders 118. The screen 44b is identical to the screen 44a in all of its properties, with the exception that the spheres 98 have been replaced by the cylinders 118, and that there is no provision for removing material between the cylinders 118 to reduce air drag. Naturally, the cylinders 118 will provide effects to the image 28 played thereupon which are distinguishable from the effects produced by the spheres 98.

Each and every pixel location in the (Z-R) scanned image 28 will align with a corresponding section of cylinder 118. The light beam created by the image path 40 belonging to the (Z-R) scanned image 28, is shown at various positions 120, 122, 124, and 126 and strikes the respective cylinder sections 118 shown at 128, 130, 132, and 134. Each cylinder 118 serves as a general point source of image light, thus enhancing the three-dimensional display 64. It is considered, as in the case of the above-noted spherically segmented screen 44a, that the cylinders 118 may be convex or external reflectors. It is also contemplated that the cylindrical convex reflectors may be composed of minute particles suspended in holographic film. It should additionally be noted that, although the cylinders 118 are shown to be aligned parallel to the axis of rotation 70, other orientations may be desirable and useful in various applications.

In an embodiment of the present invention utilizing the aforementioned screens 44a or 44b consisting of spherical, cylindrical, or other parts, it is further contemplated that such parts be arranged in the screen whereby each pixel location comprising the (Z-R) scanned image 64 coincides with a unique part in the plane of the screen 44. This method requires that not only does the (Z-R) scanned image rotate in unison with the rotating reflector system 12, but that the pixel arrangement itself rotates in unison with the rotating reflector system. This provision would then serve to maintain constant orientation of the pixels relative to their corresponding spherical, cylindrical, or other forms. In order to achieve this goal, it is, therefore, contemplated that the image rotator prism 60, or any other state-of-the-art form of optical image rotator as understood by those skilled in the art, be used in conjunction with the rotating reflector system 12, disposed on the axis of rotation. The image rotator prism 60 would then perform the function of the axes rotation processor 24.

Figure 6:
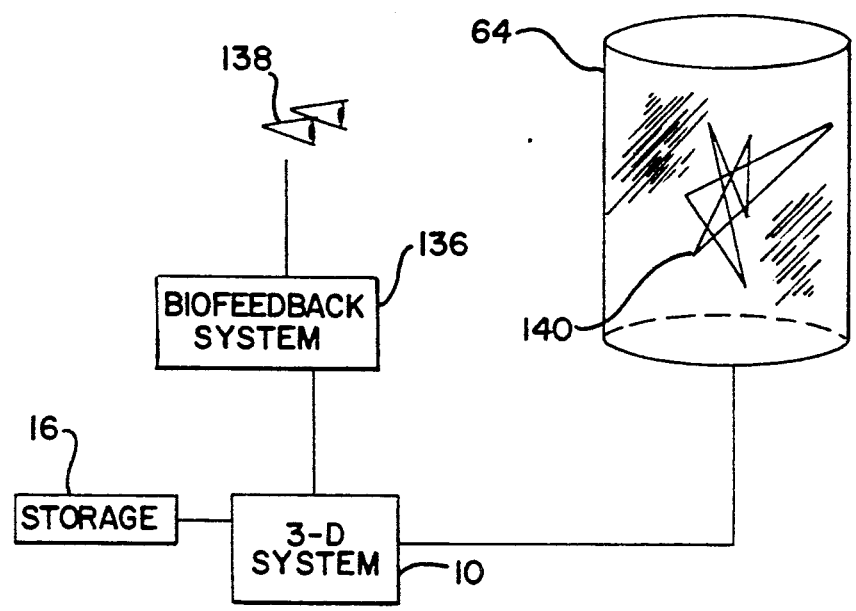
FIG. 6 is a diagrammatic representation of an alternate embodiment of the invention in which the present volume display system is shown linked to a biofeedback system.

Referring now to FIG. 6, the three-dimensional system 10 is shown linked to a biofeedback system 136. A biofeedback subject 138 feeds data corresponding to specific physiological processes, such as heart rate, to the biofeedback system 136. The biofeedback system 136 transmits the data to the computer 14 (best seen in FIG. 1) of the three-dimensional system 10. Images 140 such as rings, patterns, Lissajous figures, etc. appearing in the display 64 correspond to the biofeedback data. By incorporating imagined spatial operations with a combined biofeedback system 136 and the three-dimensional system 10, the subject 138 becomes acutely sensitive to, and learns a high degree of self-control over, the specific physiological processes being monitored by the biofeedback system 136. For example, the subject 138 may strive to slow the rotation of a ring which will correspond to the subject's heart rate. The data storage module 16 is specifically shown connected to the three-dimensional system 10. The subject 138 may use biofeedback skills towards modifying the images 140 or towards pulling up specific images from the storage module 16.

Figure 7:
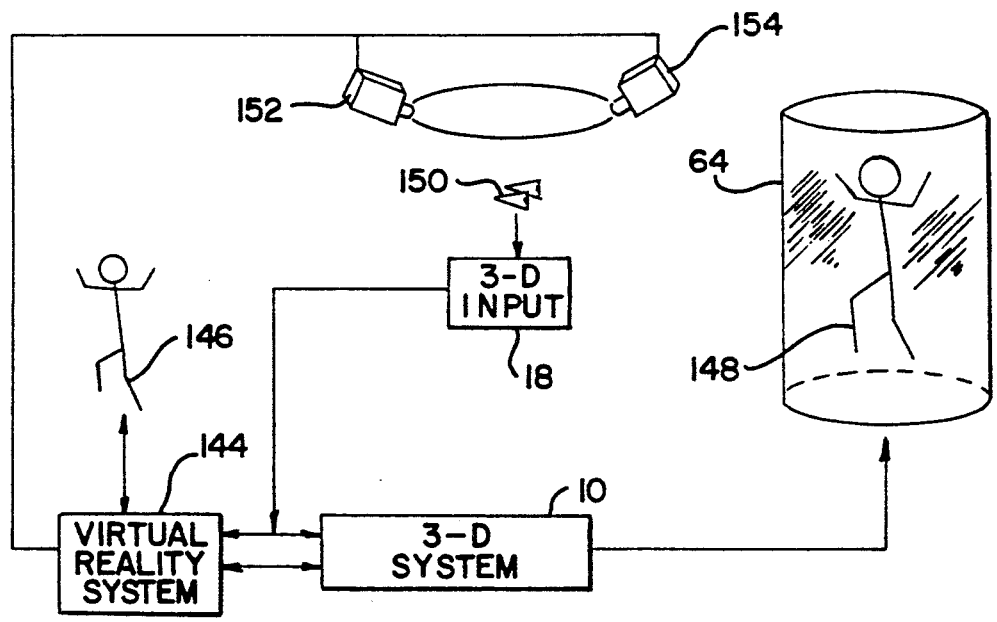
FIG. 7 is a diagrammatic representation of an alternate embodiment of the invention in which the present volume display system is shown linked to a Virtual Reality system.

Referring now to FIG. 7, the present three-dimensional system 10 is shown linked to a Virtual Reality system 144. A subject 146 of the Virtual Reality system 144 interacts with a virtual environment controlled by the Virtual Reality system 144. The Virtual Reality system 144 transmits data corresponding to the virtual environment and the subject 146 to the computer 14 (best seen in FIG. 1) of the system 10. In the display 64 is generated a three-dimensional representation of a specific volume of the virtual environment, wherein the subject's 146 presence is also depicted by an image 148. An operator 150 of the three-dimensional system 10 can observe and interact with the display 64 via the data acquisition module (3-D input module) 18. Accordingly, the operator 150 would interact with the virtual environment perceived by the subject 146. It should be further noted that additional data input to the Virtual Reality system 144 may include cameras 152 and 154 for acquiring data corresponding to the operator 150 or the display 64.

While a particular embodiment of the rotating flat screen fully addressable volume display system of the invention has been shown and described, it will be appreciated by those skilled in the art that changes and modifications may be made thereto without departing from the invention in its broader aspects and as set forth in the following claims.

I claim:

1. A rotating flat screen fully addressable volume display system comprising:
    a. scanning means for providing a two-dimensional scanned image of light;
    b. a display screen defining a plane;
    c. screen rotation means for rotating said display screen about an axis of rotation coincidental to said plane;
    d. rotating reflector means for receiving said scanned image and reflecting said scanned image onto said display screen to form a three-dimensional fully addressable image; and
    e. means for rotating said reflector means about said axis of rotation of said screen.

2. The system as defined in claim 1 wherein said rotating reflector means includes a support arm, a first reflector disposed on said support arm so as to intercept said two-dimensional image, said support arm being rotatable about said axis of rotation, and a second reflector disposed so as to intercept said image reflected by said first reflector and to project said image upon said screen.

3. The system as defined in claim 2 wherein said second reflector is coupled to said rotation means so that said first and second reflectors rotate in unison.

4. The system as defined in claim 1 wherein said image has an optical axis, and said screen is positioned so that said optical axis lies within said the plane defined by said screen.

5. The system as defined in claim 2 wherein said screen is coupled to said rotation means so that said first and second reflectors and said screen rotate in unison.

6. The system as defined in claim 1 in which said rotating reflector means further includes at least one image rotator prism disposed on said axis of rotation between said first reflector and said scanning means.

7. The system as defined in claim 6 wherein said prism is adapted to rotate said image in unison with said rotating reflector means.

8. The system as defined in claim 1 including a generally flat and generally rigid fixed plate, said plate being transparent to said scanned image.

9. The system as defined in claim 2 in which said second reflector is a fixed, frusto conical reflector.

10. The system as defined in claim 9 wherein said second reflector has a reflective surface and is disposed in a fixed position so as to cover an entire concentric circular path defined by said rotating first reflector.

11. The system as defined in claim 1 in which said rotating screen means is enclosed by a protective shell, said shell being transparent to the frequencies of light reflected off of and/or transmitted through said display screen.

12. The system as defined in claim 11 wherein said protective shell conforms to a surface of revolution generated by the rotating display screen and the rotating image.

13. The system as defined in claim 12 in which said protective shell is frusto-conical in shape.

14. A rotating flat screen fully addressable volume display system comprising:

a. scanning means for providing a two-dimensional scanned image of light;

b. computer means connected to said scanning means for processing graphics image data and transmitting said data to said scanning means;

c. a display screen generally defining a plane;

d. screen rotation means for rotating said display screen about an axis of rotation coincidental to said plane;

e. rotating reflector means for receiving said scanned image and reflecting said scanned image onto said display screen to form a three-dimensional fully addressable image; and f. means for rotating said reflector means about said axis of rotation of said screen.

15. The system as defined in claim 14 further including attenuation processor means connected to said computer means for correcting or modifying spatial distortion in said three-dimensional image.

16. The system as defined in claim 14 further including an axes rotation processor connected to said computer means for correcting or modifying continuous rotation of axes on said scanned image in said plane of said screen.

17. The system as defined in claim 14 further including data acquisition means operably and electrically connected to said computer means for transmitting data to said computer means corresponding to said three-dimensional display.

18. The system as defined in claim 17 in which said data acquisition means includes a head tracking device for viewing the position of an operator relative to the position of said three-dimensional display so as to modify aspects of said image according to the specific viewpoint of the said observer relative to the position of said three-dimensional display.

19. The system as defined in claim 17 wherein said data includes the three-dimensional image data associated with a Virtual Reality system for creating a three-dimensional, volume "theater" for the objective viewing of and interaction with a Virtual Reality environment including participating subjects.

20. The system as defined in claim 14 further including image storage means operably and electrically connected to said computer means for storing said image data produced by said data acquisition means thereby permitting the future retrieving and viewing of said three-dimensional display.

21. The system as defined in claim 14 further including frame grabbing means operably and electrically connected to said computer means and said scanning means for permitting the continuous display of a single image from the images of successive slices of rotation produced by said computer means.

22. The system as defined in claim 14 wherein said scanned image has a specified frame rate and further including synchronization means operably and electrically connected to said scanning means for synchronizing the frame rate of said scanned image with the motion of said display screen.

23. The system as defined in claim 14 wherein said scanning means includes a plurality of light beam emitters, whereby light emitted thereby may be combined in order to provide blanking to enhance specific characteristics of said three-dimensional display.

24. The system as defined in claim 23 in which said scanned image comprises ordinary, non-laser light.

25. The system as defined in claim 23 in which said scanning means includes a plurality of colored laser light emitters.

26. The system as defined in claim 17 in which said data acquisition means includes a biofeedback system adapted to create a three-dimensional display of images corresponding to the self-controlled physiological processes of a subject being monitored.

27. A display screen for use in a rotating flat screen fully addressable volume display system in which a projected two-dimensional image is reflected by a rotating reflector system upon a surface of the rotating display screen so as to create a fully addressable three-dimensional volume display on said surface, said surface of said screen comprising a plurality of three-dimensional curved shapes joined together to substantially define a plane upon which is projected the two-dimensional image from the rotating reflector system.

28. The screen as defined in claim 27 in which said curved shapes are spheres.

29. The screen as defined in claim 28 in which said spheres are translucent.

30. The screen as defined in claim 28 in which screen material between said spheres which are adjacent each other has been removed so that air may pass through said display screen.

31. The screen as defined in claim 28 in which diameters of said spheres are approximately sized relative to the diameters of light beams comprising said scanned image, so that upon being struck by said light beams, serve as general point sources of light thereof.

32. The screen as defined in claim 31 in which said spheres are spaced apart appropriately in said plane so that the location of each and every pixel coordinate in said scanned image corresponds to a unique, respective sphere.

33. The screen as defined in as defined in claim 28 in which said spheres are of uniform size.

34. The screen as defined in claim 33 in which said plane of uniformly sized spheres has a thickness equal to the diameter of one said sphere.

35. The screen as defined in claim 28 in which said spheres have a reflective surface.

36. The screen as defined in claim 27 in which said curved shapes are a plurality of minute cylinders substantially defining a plane towards the further enhancement or modification of the display.

37. The screen as defined in claim 36 in which said cylinders are translucent.

38. The screen as defined in claim 36 in which said cylinders are arranged in said plane parallel to said axis of rotation.

39. The screen as defined in claim 36 in which diameters of said cylinders are appropriately sized relative to the diameters of light beams comprising said scanned image wherein portions of said cylinders, being struck by said light beams, serve as general point sources of light thereof.

40. The screen as defined in claim 36 in which said cylinders are appropriately arranged in said plane so that each and every pixel coordinate of said scanned image corresponds to a unique, respective portion of a cylinder.

41. The screen as defined in claim 36 in which said cylinders are of uniform size.

42. The screen as defined in claim 41 in which said plane of uniformly sized cylinders has thickness equal to the diameter of one said cylinder.

43. The screen as defined in claim 36 in which said cylinders have a reflective outer surface.

44. The screen as defined in claim 27 in which said display screen includes an outer surface being sensitive to wavelengths of light comprising said scanned image, so that said scanned image being projected thereon may be modified as a function of the sensitivity of said surface.

45. The screen as defined in claim 44 in which said display screen includes phosphor material affixed to said surface to permit the observation of images generated by said scanning means producing non-visible light.

46. The screen as defined in claim 45 in which said phosphor material affixed to surface of said display screen is sensitive to x-rays.

47. The screen as defined in claim 45 in which said phosphor material affixed to surface of said display screen is sensitive to ultraviolet wavelengths.

48. A rotating reflector system for use with a rotating flat screen fully addressable volume display system including a scanner which generates a two-dimensional image for projection upon a rotating screen to produce a fully addressable three-dimensional display, said screen rotating about an axis, said system comprising:

a support arm extending transverse to the axis of rotation of said screen and having first and second ends and an openig adapted to receive a projected image therethrough;

means for rotating said arm about the axis of rotation of said screen; and a first reflector fixed to said arm to rotate therewith about the axis of rotation of said screen and disposed to intercept and reflect the image to a specified point.

* * * * *